United States Patent Office

2,789,976
Patented Apr. 23, 1957

2,789,976

N-CARBOXYALKYL HEXITYL AMINES

John D. Zech, Wilmington, Del., assignor to Atlas Powder Company, Wilmington, Del., a corporation of Delaware No Drawing. Application September 9, 1953,
Serial No. 379,306

9 Claims. (Cl. 260—211)

The present invention relates to a new class of chemical compounds. More particularly it relates to N-carboxyalkyl hexityl amines, alkali salts thereof, and methods of preparing same.

It is an object of the present invention to provide new chemical compounds that are carboxyalkyl hexityl amines. It is another object to prepare alkali salts of said carboxyalkyl hexityl amines. It is another object of the present invention to provide methods for the manufacture of said carboxyalkyl hexityl amines and their salts. These and many other objects and advantages will become obvious to those skilled in the art from the following discussion and disclosure.

The compounds of the present invention may be represented by the following generic formula:

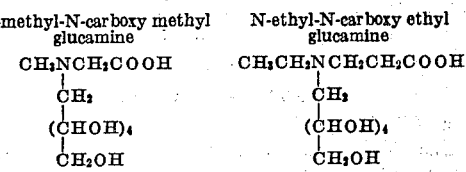

wherein the empirical formula ($C_6H_{13}O_5$) represents the hexane pentol residue of a hexityl amine, R is a lower alkyl radical containing 1 to 3 carbon atoms, or a lower hydroxy alkyl radical containing 1 to 3 carbon atoms, $n$ is 1 to 2. Y is selected from the group consisting of hydrogen, and monovalent alkali metals.

The structure of the type of compound that is included within the scope of the present invention will be more readily understood by an examination of the formulae (spatial confiuration having been ignored) of two specific compounds that are given below:

| N-methyl-N-carboxy methyl glucamine | N-ethyl-N-carboxy ethyl glucamine |
|---|---|
| CH₃NCH₂COOH | CH₃CH₂NCH₂CH₂COOH |
| CH₂ | CH₂ |
| (CHOH)₄ | (CHOH)₄ |
| CH₂OH | CH₂OH |

The compounds of the present invention are prepared by reacting a suitable secondary hexityl amine with a carboxyalkylating agent. A hexityl amine is an amino derivative of a hexitol such as sorbitol, mannitol, dulcitol, etc., wherein any one of the hydroxy groups has been replaced by an amino group. Such hexityl amines are conveniently prepared by the catalytic reduction of a hexose in the presence of a suitable primary amine. Suitable such secondary hexityl amines include, but are not limited to, N-methyl, N-ethyl, N-propyl, N-hydroxyethyl, N-hydroxypropyl, N-dihydroxypropyl glucamines; N-methyl, N-ethyl, etc. fructamines, and the like.

The compounds of the present invention are prepared by reacting a secondary hexityl amine with a carboxyalkylating agent which is defined as a compound capable of introducing a carboxyalkyl radical, or a radical that may be easily converted into a carboxyalkyl radical, or an alkali metal salt thereof, into the hexityl amine, by displacing an amino hydrogen. A radical that can be easily converted into a carboxyalkyl radical may be represented by the formula (—$C_nH_{2n}X$) which is a substituted lower alkyl radical that can be easily converted to a carboxyalkyl radical, wherein $n$ is 1 to 2, and X is selected from the group consisting of

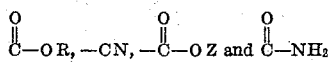

In the radical

R is a lower alkyl radical containing 1 to 3 carbon atoms. In the formula

Z is an alkali metal. Any of the foregoing radicals may be converted easily into a carboxyalkyl radical by such simple processes as hydrolysis, saponification, etc. Suitable carboxyalkylating agents include, but are not limited to such as: monochloracetic acid, monobromoacetic acid, sodium chloracetate, potassium chloracetate, α-chloropropionic acid, α-bromopropionic acid, β-chloropropionic acid, β-bromopropionic acid, acrylic acid, acrylic acid esters, etc. Where such carboxyalkylating agents as acrylic acid esters are used, the amino acid may be obtained by hydrolysis of the ester that is obtained by the use of an acrylic acid ester as a carboxyalkylating agent. The compounds of the present invention may also be obtained by reacting the secondary hexityl amine with a hydroxy nitrile, or unsaturated nitriles, such as: glycolonitrile, lactonitrile, or acrylonitrile, and then hydrolyzing the product of the reaction, a N-cyanoalkyl hexityl amine, in the presence of water and alkali, to liberate amonia and yield the N-carboxyalkyl hexityl amine salt of the alkali used. The free acid may be obtained by the addition of an equivalent amount of a strong acid, such as HCl or $H_2SO_4$.

The preferred method of preparing the compounds of the present invention, is by reacting a secondary hexityl amine with a halogenated carboxylic acid. As carboxyalkylating agents, the halogenated carboxylic acids or its corresponding alkali salt are preferred because of their availability, cost, and the relatively simple operating conditions necessary to form the products of the present invention. This reaction is conveniently carried out by reacting the desired secondary hexityl amine with an aqueous solution of the sodium salt of the halogenated carboxylic acid at temperatures of about 20° C. to about 125° C., with the preferred temperature ranging from about 50 to 100° C. When using such a carboxyalkylating agent as acrylic acid, an aqueous or alcoholic solution of the secondary hexityl amine is reacted with the acrylic acid at a temperature of about 30° C. to 125° C. When the carboxyalkylating agent is an acrylic acid ester, then the reaction temperature may vary from 50° C. to 150° C. This type of reaction may also be carried out in the presence of an inert solvent such as methanol, pyridine, etc. It may also be carried out under pressure and in the presence of known reagents which inhibit the polymerization of acrylic esters. In those cases where a free acid is formed, they may be converted to an alkali salt by neutralizing said acid with an alkali metal hydroxide. The alkali metal salts, particularly valuable, are the sodium, potassium and lithium salts. Of these, the sodium salts are preferred.

The compounds of the present invention are extremely effective as sequestering agents and metallic ion deactivators.

The following examples are given by way of illustration and are not intended to limit the scope of the invention in any way.

Example I

To a mixture of 195 g. methyl glucamine, 250 cc. methanol and 25 cc. of water was added 81.5 g. of a 70% solution of glycolonitrile at 36–38° C. during 18 minutes. The solution was stirred at 33–39° C. for another 80 minutes. The temperature was then raised gradually to 64° C. during 2 hours and 58–60° for another 70 minutes after which solvent was distilled off under vacuum to a top temperature of 91° C. The product (236.5 g.) solidified on cooling. 26.4 g. of the product was dissolved in 20 cc. of water and 6.5 g. of solid NaOH was added. Vigorous boiling with evolution of NH₃ occurred as the NaOH was dissolved. The mixture was heated on the steam bath until evolution of NH₃ ceased, adding water from time to time to replace water lost by evaporation. The resultant solution was a solution of the sodium salt of N-methyl N-carboxymethyl glucamine.

Example II

A solution of sodium chloracetate was prepared by carefully neutralizing a solution of 94.5 g. chloracetic acid in 200 cc. of water at 10–15° C. with a solution of 40 g. NaOH in 200 cc. of water. 195 g. of methyl glucamine was added to this solution. The solution was heated to 52° C. and then 220 cc. of water was distilled off under vacuum. The concentrated solution was heated to 81° C. The reaction became exothermic, the temperature rising in 10 minutes to 91° C. After the exothermic reaction had subsided, the solution was heated to 112° C. and held there for 50 minutes. The solution was diluted to 1000 cc. with water and filtered to clarify it. It was a solution of N-methyl N-carboxymethyl glucamine containing one mole of sodium chloride. The water was then stripped off and the N-methyl, N-carboxymethyl glucamine was taken up in methanol. This solution was then evaporated to dryness to yield N-methyl, N-carboxymethyl glucamine.

Example III 74 g. of acrylic acid (glacial) was added to a solution of 195 g. methyl glucamine and 195 cc. of water at 36–59° C. during 6 minutes. The solution was heated to 105° C. and held there for 40 minutes. 130 cc. of water was distilled off under vacuum at 65–105° C. The concentrated solution was held at 84–104° C. for another 3 hours and then diluted to 1-liter with water. It was a solution of N-methyl, N-carboxyethyl glucamine.

A portion of this solution was evaporated on the steam bath and finally dried in a vacuum oven at 60° C. The residue was a clear taffy-like resinous material which was hygroscopic.

Example IV 18.9 g. of monochloracetic acid was dissolved in 75 cc. of water and the solution cooled to 0°C. While cooling, a solution of 8.1 g. NaOH in 35 cc. of water was added during 5 minutes with good agitation, keeping the temperature below 2° C. To the cold solution of sodium chloracetate was added 41.8 g. of N-ethyl glucamine. The temperature was raised to 80° C. by the application of heat. After the exothermic reaction had subsided, the temperature was raised to 103° C. and held there for 2¾ hours. It was then cooled to room temperature and diluted to a volume of 250 cc. with distilled water giving a solution of ethyl glucamine acetic acid which is approximately 0.8 molar in concentration.

What is claimed is:

1. A compound of the formula:

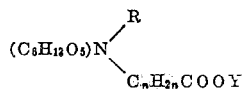

where $(C_6H_{13}O_5)$ is the hexane pentol residue of a hexityl amine, R is selected from the group consisting of lower alkyl radicals containing 1 to 3 carbon atoms and lower hydroxy alkyl radicals containing 1 to 3 carbon atoms, $n$ is 1 to 2, Y is selected from the group consisting of hydrogen and monovalent alkali metals.

2. A compound of claim 1 wherein R is a lower alkyl group containing 1 to 3 carbon atoms.

3. A compound of the formula:

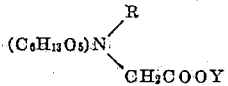

wherein $(C_6H_{13}O_5)$ is the hexane pentol residue of a hexityl amine, R is selected from the group consisting of lower alkyl radicals containing 1 to 3 carbon atoms and lower hydroxy alkyl radicals containing 1 to 3 carbon atoms, Y is selected from the group consisting of hydrogen and monovalent alkali metals.

4. The compounds of claim 3 wherein R is a lower alkyl radical containing 1 to 3 carbon atoms.

5. A compound of the formula:

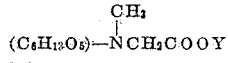

wherein $(C_6H_{13}O_5)$ is the hexane pentol residue of glucamine, Y is selected from the group consisting of hydrogen and monovalent alkali metals.

6. A compound of the formula:

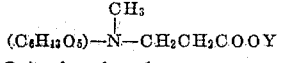

where $(C_6H_{13}O_5)$ is the hexane pentol residue of glucamine, Y is selected from the group consisting of hydrogen and monovalent alkali metals.

7. A compound of the formula:

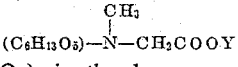

wherein $(C_6H_{13}O_5)$ is the hexane pentol residue of fructamine, Y is selected from the group consisting of hydrogen and monovalent alkali metals.

8. A compound of the formula:

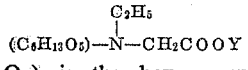

wherein $(C_6H_{13}O_5)$ is the hexane pentol residue of glucamine, Y is selected from the group consisting of hydrogen and monovalent alkali metals.

9. A compound of the formula:

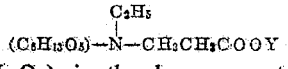

wherein $(C_6H_{13}O_5)$ is the hexane pentol residue of glucamine, Y is selected from the group consisting of hydrogen and monovalent alkali metals.

References Cited in the file of this patent

Karrer et al.: Chem. Abs. 31, 3012–3 (1937).